United States Patent [19]

Muz

[11] Patent Number: 4,660,790
[45] Date of Patent: Apr. 28, 1987

[54] CABLE SUPPORT WITH TINES

[75] Inventor: Edwin Muz, Reutlingen, Fed. Rep. of Germany

[73] Assignee: Nicolay GmbH, Krichheim, Fed. Rep. of Germany

[21] Appl. No.: 802,023

[22] Filed: Nov. 25, 1985

[30] Foreign Application Priority Data

Dec. 5, 1984 [DE] Fed. Rep. of Germany ....... 3444271

[51] Int. Cl.⁴ .............................................. F16L 3/22
[52] U.S. Cl. ..................................... 248/68.1; 24/576;
  174/156; 248/67.7; 248/74.4
[58] Field of Search ................... 248/68.1, 74.4, 67.5,
  248/67.7, 73, 221.3, 222.1, 223.3, 316.1, 317.7,
  558; 24/576, 616, 617, 115 G; 174/155, 156, 157

[56] References Cited

U.S. PATENT DOCUMENTS

| | | | |
|---|---|---|---|
| 2,059,988 | 11/1936 | Frank | 174/155 UX |
| 2,110,528 | 3/1938 | Pailin | 174/70 C |
| 3,557,413 | 1/1971 | Engle | 24/576 |
| 4,022,967 | 5/1977 | Bulanchuk | 174/156 |
| 4,030,540 | 6/1977 | Roma | 248/68.1 X |
| 4,447,935 | 5/1984 | Ausnit | 24/576 X |

FOREIGN PATENT DOCUMENTS 934771 8/1963 United Kingdom .

*Primary Examiner*—Ramon O. Ramirez
*Attorney, Agent, or Firm*—Roylance, Abrams, Berdo & Goodman

[57] ABSTRACT

A cable support with tines has a first tined member including open chambers between its tines. Each chamber receives one cable. To hold the individual cables tightly independently of their dimensional deviations, a second tined part with an identical tine distribution is associated with the first tined part. The tines of the first tined part are positioned between the tines of the second tined part. A detachable catch connection provides two-way connection of the two tined parts.

16 Claims, 4 Drawing Figures

Fig.1
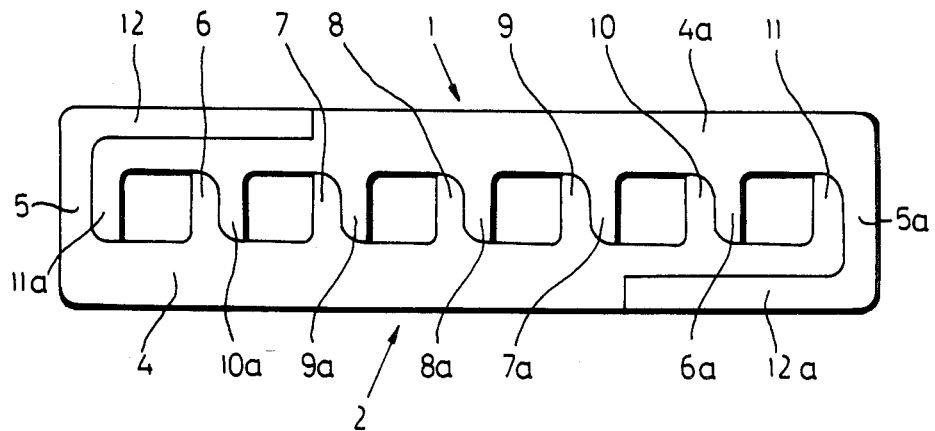
Fig.2
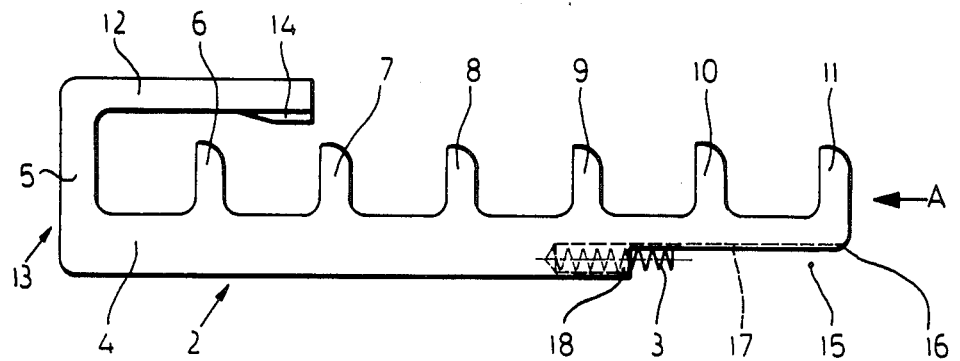
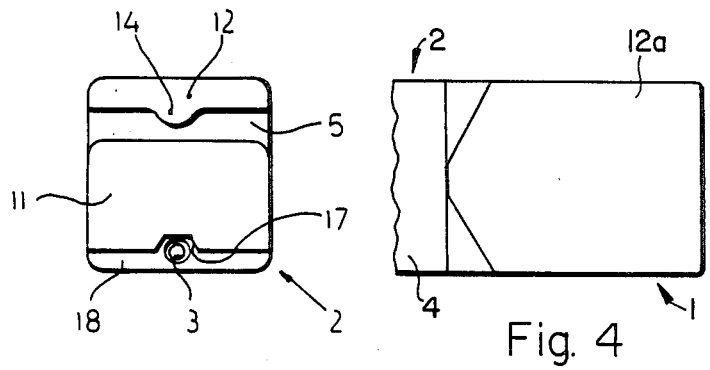
Fig.3
Fig.4

CABLE SUPPORT WITH TINES

FIELD OF THE INVENTION

The present invention relates to a cable support with tines for individually engaging a plurality of cables.

BACKGROUND OF THE INVENTION

In a known cable support, the chambers are circular in transverse cross section and are tapered on their outsides. For laying cables lying parallel and next to one another on the cable support, the open sides of the chambers must be widened elastically. The cables are then held under the elastic bias.

However, this conventional cable support does not operate properly if the cables are oversized or undersized. If a cable is oversized, it can be adapted to the chamber only with difficulty. For a cable which is smaller in cross section, it is not held sufficiently tightly in the chamber.

SUMMARY OF THE INVENTION

An object of the present invention is to provide a cable support which will hold individual cables tightly independently of their different dimensions.

Another object of the present invention is to provide a cable support which is simple and inexpensive to manufacture and operate.

The foregoing objects are obtained by a cable support comprising first and second parts with similarly distributed tires, and a catch on the parts for detachably coupling the parts and forming a two-way connection. The times of each part define open chambers between the tines for holding cables. The parts are engaged such that the each of the tines on the first part is positioned between a respective pair of the tines on the second part.

The two tined parts cooperate. The outwardly open chambers in each part are closed by the other part.

Each tined part can have a U-shaped end and a mating opposite end to prevent separation of two cooperating parts in the lengthwise direction of the tines, in other words, in the direction from their connected ends toward their free ends.

Preferably, the catch comprises an inward projection on a free end of the U-shaped end and a mating recess on the other end of the tined part. This facilitates operation and manufacture of the cable support The tined parts can be biased away from each other by a compression spring. This permits the tined parts to move relative to each other adapting itself to the diameter of the thickest cable positioned therein. Additionally, both tined parts exert a force on this cable.

The compression spring can be mounted in a bore forming a space-saving installation of the compression spring.

The holding of the compression spring solely by the one tined part holding this compression spring prevents dropping of the spring upon separation of the parts.

Securing a cable in the chamber covered by the free arm of the U-shaped end of the tined part can be facilitated by making the free arm elastically flexible.

When the tined parts are fitted together in the direction of the cable held by these parts, the compression springs can be biased by a wedge shape of the free arm.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 1 is a side elevation view of a cable support according to the present invention;

FIG. 2 is a side elevational view of one tined part of the cable support of FIG. 1; and FIG. 3 is an end elevational view of the tined part taken in the direction of arrow A in FIG. 2.

DETAILED DESCRIPTION OF PREFERRED EMBODIMENT

The cable support of the present invention has two identically configured tined parts or members 1 and 2. A single tined member 2 is shown in FIG. 2 with a compression spring 3. The description of tined member 2 also applies for tined member 1.

Tined member 2 has a longitudinal base extending along its longitudinal axis. Seven tines 5 to 11 project perpendicularly from this base. Tines 6 to 11 are all of the same height. Tine 5 has a free arm 12 exteending from the end of tine 5 remote from base 4. Free arm 12, tine 5 and the adjacent part of base 4 form a U-shaped end 13. Free arm 12 extends for some distance completely over tine 6 and into the vicinity of tine 7.

Free arm 12 has a snap acting catch 14 projecting inwardly at its free end in the direction of tines 6 and 7. A recess 15 is found on the end 16 of tined member 2 opposite U-shaped end 13. The recess is adapted to receive free arm 12. Viewed from the direction of tine 11, recess 15 extends to the vicinity of tine 9.

A positioning slot 17 extends along tined member 2 on its side opposite tines 10 and 11, and at end 16 including recess 15. As shown in FIGS. 3, slot 17 has oblique walls and tapers inwardly.

The compression spring 3 is mounted in a bore in shoulder 18 of base 4. Shoulder 18 defines an end of recess 15. The spring projects beyond shoulder 18 into positioning slot 17. Snap catch 14 is configured to mate with and fit into positioning slot 17. The snap catch 14 on one of the tined members 1 or 2 and the positioning slot 17 on the other tined member 2 or 1 form an easily detachable catch connection.

Tined members 1 and 2 are assembled in the position illustrated in FIG. 1. The individual parts of tined member 1 corresponding to tined member 2 are identified with the same reference numbers, but with the letter a added.

As shown in FIG. 1, free arm 12 of tined member 2 is engaged in the corresponding recess in tined member 1. Free arm 12a of tined member 1 is engaged in recess 15 in tined member 2. The tines of the cable support define chambers of square construction. Compression spring 3 rests on the bottom of the bore in base 4 of tined member 2 which supports it. The opposite end of the spring rests on the planar front end of free arm 12a of tined member 1. The same arrangement is provided for the compression spring in the bore in tined member 1 and resting against the front end of free arm 12. Both compression springs are biased to push tined members 1 and 2 apart from each other in a lengthwise direction, and thus, to diminish the chambers which are defined by the individual tines.

To introduce cables into the cable support, the tined members 1 and 2 are separated. The cables are placed in the open chambers of the separated tined part 1, from above between the individual tines 5 to 11. To introduce cables in the chambers defined by tines 5 and 6 and tines 6 and 7, free arm 12 must be pivoted to the side, and therefore, it must be elastic.

Tined member 1 is set on the cables at some distance from tined member 2. The U-shaped end is similarly bent or pivoted for introduction of cables. Tined member 1 with cables in its chambers is then moved toward tined member 2, which is likewise holding cables, and both members are fitted together. Compression springs 3 contact the front end of each of the free arms 12 and 12a of tined members 2 and 1. Both compression springs 3 bias the tined members to move away from each other diminishing the chambers of both tined parts 1 and 2 to grip the cables.

To detach tined parts 1 and 2 from each other, snap catches 14 are removed from the associated positioning slots 17 by applying opposite side forces on the tined parts. The cables can then be removed separately from the chambers limited by the tines of tined parts 1 and 2.

In the separated state, compression springs 3 are not separated from their tined parts 1 and 2. These springs are snugly fitting in the bore holding them. In order to bring each compression spring into its work position during mutual connecting of tined members 1 and 2, the front ends of free arms 12 and 12a of tined members 2 and 1 can be chamfered into a wedge shape seen in plan view (FIG. 4).

The cable support with tines is shown in the drawing with a scale having an approximately 3:1 ratio. With the exception of compression springs 3, the cable support is formed of injection molded plastic.

While a particular embodiment has been chosen to illustrate the invention, it will be understood by those skilled in the art that various changes and modifications can be made therein without departing from the scope of the invention as defined in the appended claims.

What is claimed is:

1. A cable support, comprising:
   a first part having a first longitudinal base with first tines extending therefrom defining first open chambers between said first tines for holding cables;
   a second part having a second longitudinal base with second tines extending therefrom defining second open chambers between said second tines for holding cables, said first and second tines being similarly distributed, said first and second parts being engaged such that each of said first tines is positioned in one of said second open chambers laterally between a respective pair of second tines and each of said second tines is positioned in one of said first open chambers laterally between a respective pair of said second tines such that all of said tines are laterally offset and such that said chambers are laterally closed and axially open to surround the cables extending perpendicular to said tines and axially through said chambers; and
   catch means, on said parts, for detachably connecting said parts and for forming a two-way connection.

2. A cable support according to claim 1 wherein said first and second parts comprise substantially identical configurations with each of said parts having
   a first end with a U-shaped member, and
   a second end, opposite said first end, shaped to fit within said U-shaped member.

3. A cable support according to claim 2 wherein said catch means comprises an inwardly extending projection on a free arm of said U-shaped member of said first part, and a recess in said second end of said second part mating with and forming a snap connection with said projection.

4. A cable support according to claim 3 wherein said free end of said U-shaped member on said first part has a front end; said second part comprises a shoulder facing said front end; and a compression spring located between said front end and said shoulder biases said parts in a direction away from each other.

5. A cable support according to claim 4 wherein said compression spring is mounted in a bore in said second part, said bore and recess being coaxially aligned.

6. A cable support according to claim 5 wherein said compression spring is supported solely by said bore in said second part.

7. A cable support according to claim 2 wherein said U-shaped member of each of said parts comprises a free arm extending over more than one of said chambers thereof, said free arm being elastically flexible for introducing a cable in said chambers.

8. A cable support according to claim 7 wherein each said free arm comprises a surface extending transverse to the longitudinal axis of the respective part and chamfered forming a wedge shape when viewed in the plane of the cable.

9. A cable support according to claim 1 wherein said first and second parts are relatively movable in a lateral direction such that said tines are adjustably positioned in said chambers.

10. A cable support, comprising:
    a first part having first tines extending therefrom defining first open chambers between said first tines for holding cables;
    a second part having second tines extending therefrom defining second open chambers between said second tines for holding cables, said first and second tines being similarly distributed, said first and second parts being engaged such that each of said first tines is positioned between a respective pair of second tines, said first and second parts having substantially identical configurations with each of said parts including a first end with a U-shaped member, and a second end, opposite said first end, shaped to fit within said U-shaped member;
    catch means, on said parts, for detachably connecting said parts and for forming a two-way connection, said catch means including an inwardly extending projection on a free arm of said U-shaped member of said first part, and a recess in said second end of said second part mating with and forming a snap connection with said projection;
    a front end on said free end of said U-shaped member on said first part;
    a shoulder on said second part facing said front end; and
    a compression spring located between said front end and said shoulder biasing said parts in a direction away from each other.

11. A cable support according to claim 10 wherein said compression spring is mounted in a bore in said second part, said bore and recess being coaxially aligned.

12. A cable support according to claim 10 wherein said compression spring is supported solely by said core in said second part.

13. A cable support according to claim 10 wherein said first and second parts are relatively movable in a lateral direction such that said tines are adjustably positioned in said chambers.

14. A cable support, comprising:
a first part having first tines extending therefrom defining first open chambers between said first tines for holding cables;
a second part having second tines extending therefrom defining second open chambers between said second tines for holding cables, said first and second tines being similarly distributed, said first and second parts being engaged such that each of said first tines is positioned between a respective pair of second tines, said first and second parts having substantially identical configurations with each of said parts including a first end with a U-shaped member, and a second end, opposite said first end, shaped to fit within said U-shaped member, said U-shaped member of each of said parts having a free arm extending over more than one of said chambers thereof, said free arm being elastically flexible for introducing a cable in said chambers; and
catch means, on said parts, for detachably connecting said parts and for forming a two-way connection.

15. A cable support according to claim 14 wherein each said free arm comprises a surface extending transverse to the longitudinal axis of the respective part and chambered forming a wedge shape when viewed in the plane of the cable.

16. A cable support according to claim 14 wherein said first and second parts are relatively movable in a lateral direction such that said tines are adjustably positioned in said chambers.

* * * * *